(12) United States Patent
Smith

(10) Patent No.: US 9,038,308 B2
(45) Date of Patent: May 26, 2015

(54) TENSION/COMPRESSION DECOY MOTION DEVICE

(71) Applicant: Kyle Patrick Smith, Leesburg, GA (US)

(72) Inventor: Kyle Patrick Smith, Leesburg, GA (US)

(*) Notice: Subject to any disclaimer, the term of this patent is extended or adjusted under 35 U.S.C. 154(b) by 363 days.

(21) Appl. No.: 13/669,420

(22) Filed: Nov. 5, 2012

(65) Prior Publication Data

US 2014/0123460 A1   May 8, 2014

Related U.S. Application Data

(60) Provisional application No. 61/628,687, filed on Nov. 4, 2011.

(51) Int. Cl.
*A01M 31/06* (2006.01)
(52) U.S. Cl.
CPC ..................................... *A01M 31/06* (2013.01)

(58) Field of Classification Search
CPC ........................................................ A01M 31/06
USPC ............................................................. 43/2, 3
See application file for complete search history.

(56) References Cited

U.S. PATENT DOCUMENTS

| 5,459,958 | A  | * | 10/1995 | Reinke ............................... 43/2 |
| 6,760,993 | B2 | * | 7/2004  | Lebens ............................... 43/3 |
| 7,562,487 | B2 | * | 7/2009  | Barr .................................... 43/2 |
| 7,908,785 | B2 | * | 3/2011  | Allen et al. ........................ 43/3 |
| 2009/0007479 | A1 | * | 1/2009 | Jerome, Sr. ........................ 43/2 |

* cited by examiner

*Primary Examiner* — Christopher P Ellis
*Assistant Examiner* — Michael Wang

(57) ABSTRACT

The current invention is a motion imparting decoy device that will help individuals to more effectively lure game animals into reasonable range.

14 Claims, 5 Drawing Sheets

TENSION/COMPRESSION DECOY MOTION DEVICE

CROSS-REFERENCE TO RELATED APPLICATIONS

Provisional Application No. 61/628,687 with Confirmation NO. 1876

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISK APPENDIX

Not applicable

BACKGROUND OF THE INVENTION

The present invention is in the technical field of decoys. More particularly, the present invention is in the technical field of devices that impart motion to decoys.

Essentially a sportsman has two options when pursuing game, they can either approach the game through stealth or they can attempt to lure the game to their position. Either way, the goal is to close the gap between the sportsman and the game so the game can be effectively harvested and or photographed. The sportsman may rely on many methods and techniques to achieve this goal, including but not limited to camouflage, scent elimination and the utilization of calls and decoys that simulate the sounds and appearance of the game being pursued by the sportsman.

A majority of the conventional decoys used by sportsman are often motionless and can be the root cause of the inability to lure game, and they oftentimes spook or frighten these game animals. Live animals are seldom completely motionless when they are in a relaxed state, so it would only make sense to have a decoy capable of movement when used in the pursuit of these animals.

This application would not be the ideal space to elaborate on all the different types of motions that live animals demonstrate since they are essentially infinite, however it may helpful to look at one of the mating ritual motions of one of the most revered North American game animals. When a turkey struts he first appears to 'puff up' his body by raising both his body and tail feathers. Afterward the turkey often begins to walk in a tight, circular path that is typically obscured by his downward pointing wing feathers, which gives the illusion that he is spinning on his legs, not unlike a top (the toy).

SUMMARY OF THE INVENTION

The present invention is a tension/compression decoy motion device ("device") that will give the sportsman and/or hunter the ability to impart motion to an otherwise static decoy. The general idea is that this device would give the sportsman the ability to add a motion that emulated, among other movements, a live turkey's strut to any number of the previously known decoys on the market.

In one embodiment, the person using the device would pull a string which would rotate the decoy mounted onto the device. While the sting is being pulled, a coil assembly that is wound around a section of the decoy stake will load with an increasing amount of tension/tightness. When the string is released or more appropriately, gradually eased in the opposite direction then the device and in turn the decoy would rotate in the other direction. This would occur because as the string is released, the coil spring relaxes and therefore rewinds the cord onto the spool. It can be viewed as a sort of back and forth pulling/releasing motion during which the decoy rotates and counter rotates as long as the user imparts the pulling and relaxing action to the device. The motion can be varied by the length and intensity of the string pull, so as to allow the decoy to do full rotations or just short erratic movements.

DETAILED DESCRIPTION OF THE INVENTION

In the following detailed description of the preferred embodiments, reference is made to the accompanying drawings which form a part hereof, and within which are shown by way of illustration specific embodiments by which the invention may be practiced. It is understood that other embodiments may be utilized and structural changes may be made without departing from the scope of the invention.

Turning now to the drawings wherein like numbers refer to like features throughout the drawings, the present invention comprises a spinning decoy motion device.

Figure 1:
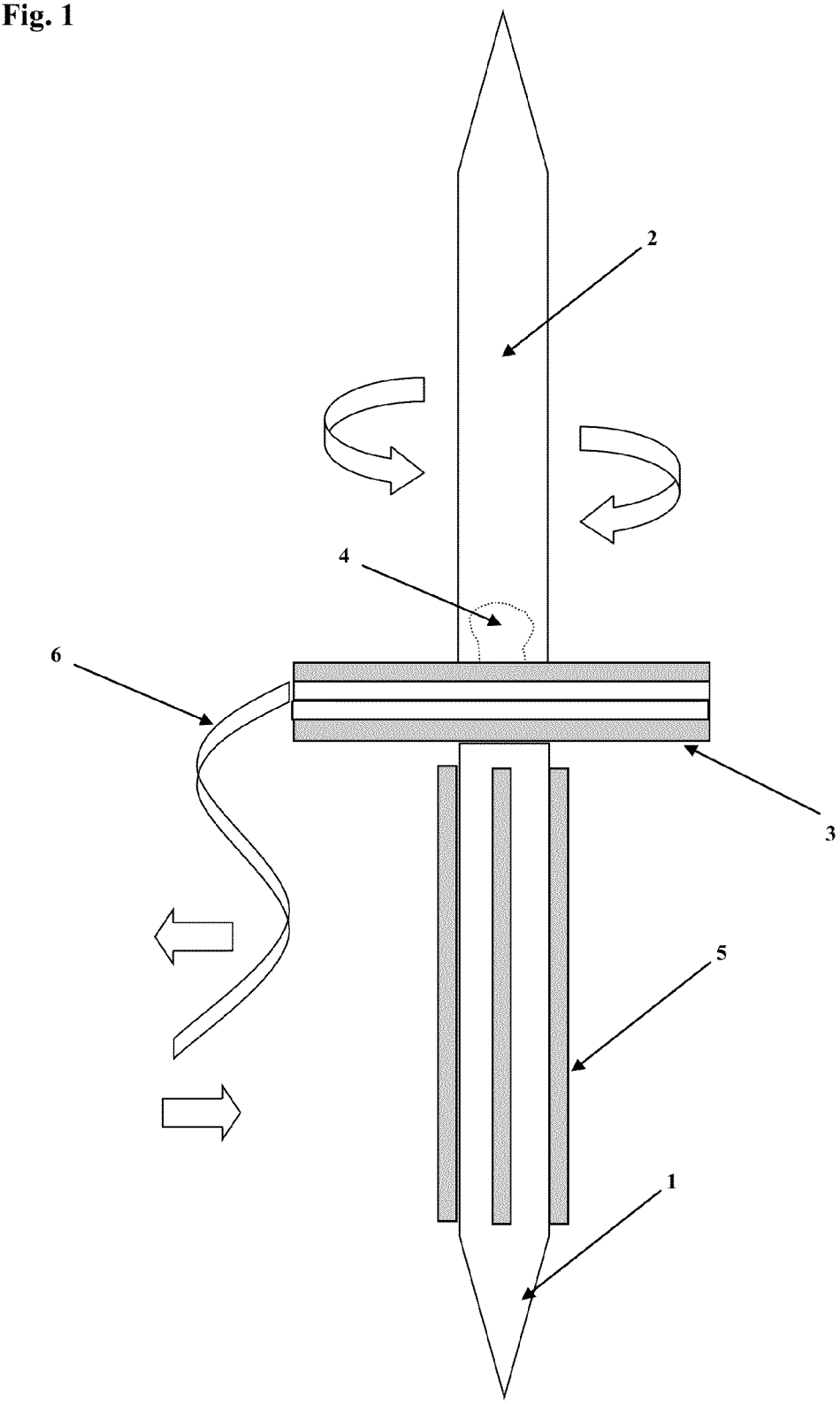
FIG. 1 is a front view of one embodiment of a tension/compression decoy motion device of the present invention.

Referring now to the invention in more detail, in FIG. 1 there is shown an front view of a lower stake 1 that can be inserted into the ground and therefore maintain relatively motionless during operation. In the preferred embodiment the lower stake 1 may also contain fins 5 that act to hold the stake in place. An upper stake 2 will be mounted onto a spring assembly 3 and this will in turn be mounted onto the lower stake 1 in such a way to allow the upper stake 2 to rotate in either direction with the lower stake 1 held stationary. In the preferred embodiment, the spring assembly 3 and upper stake are shown to be attached to the lower stake 1 via a pivot point connection 4. This pivot point 4 can be constructed in any number of previously known ways to attach two objects while still allowing some degree of flexibility and motion between the two connected objects. Motion will be imparted to the upper stake 2 and spring assembly 3 when the cord/string 6 that is wound around the spring assembly 3 is pulled and/or released. Although it is shown in this embodiment that the upper stake 2 and spring assembly 3 are the sections that rotate and/or have motion, it is reasonable to assume that motion could be inverted just as easily to the lower stake 1 in another embodiment of the present invention. In order for motion to be transferred from the device to a decoy the decoy will simply be placed and/or mounted onto the upper stake 2. Although in this preferred embodiment of the current invention the motion is mostly meant to impart motion directly to the decoy that it is attached, in another embodiment the device can also impart motion to any number of decoys placed along the cord/string 6 between the anchoring point and the sportsman.

Figure 2:
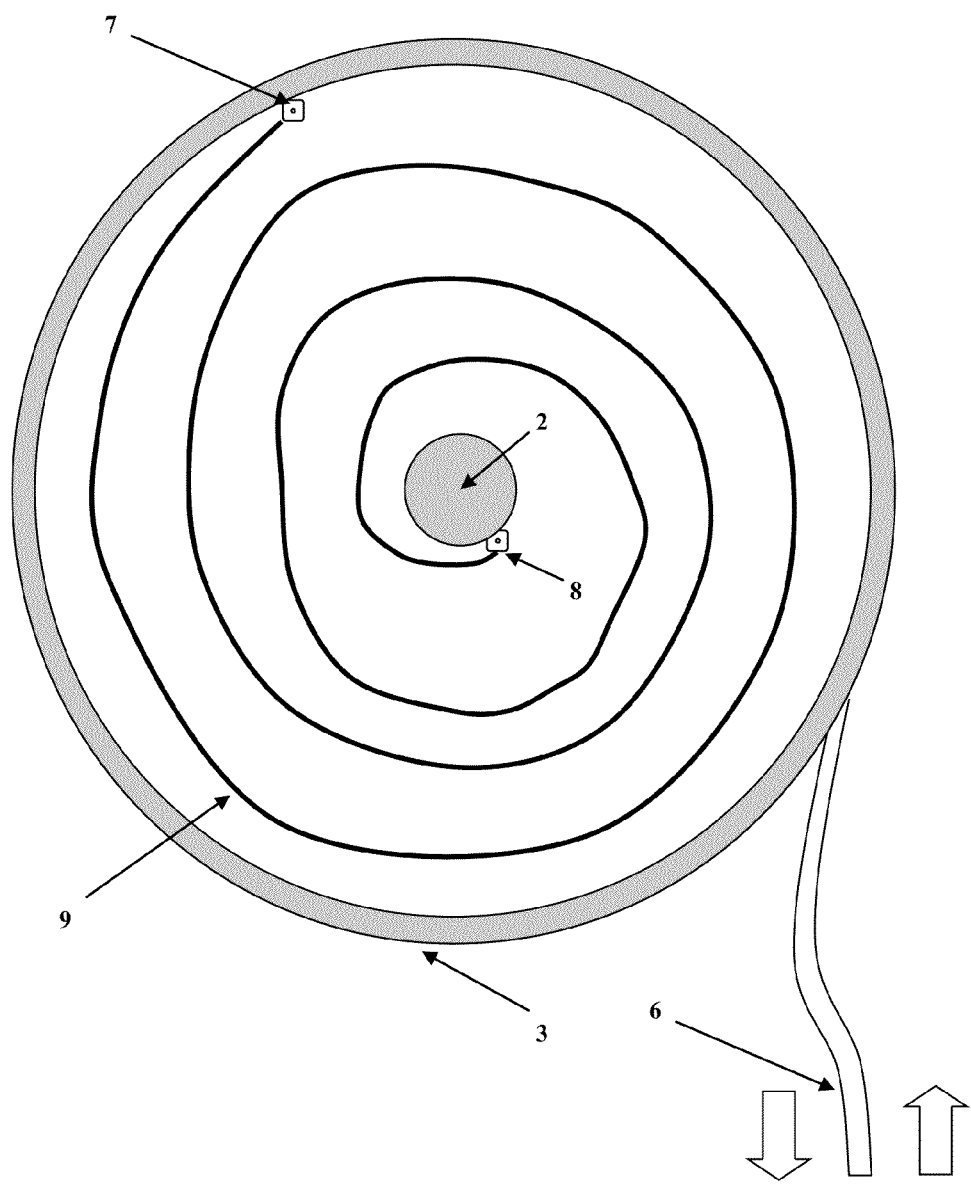
FIG. 2 is a top/breakaway view of one embodiment of the coil assembly for a tension/compression decoy motion device of the present invention.

Referring now to the invention shown in FIG. 2 there is shown a top/exploded view of the spring assembly 3. In this top/exploded view embodiment of a portion of the current invention the spring assembly 3 is shown to internally consist of a thin metal strip 9 that has been attached to both the outer case attachment point 7 and the inner rod attachment point 8, which in this embodiment will be attached to the upper stake 2. The thin metal strip will be attached to the two attachment points 7 & 8 in a way that will create a low tension coil of wire when the spring assembly 3 is relaxed. In this embodiment the inner rod attachment point 8 is shown to be directly attached to the upper stake 2; however it could be attached in innumerable ways, including but not limited to a sleeve that could then be mounted to the upper stake 2. In the preferred embodiment, the thin metal strip 9 would load cord/string 6 on the outside of the spring assembly 3 by allowing itself to be compressed/loaded until it has a desired amount of torsion and then the cord/string 6 would be tied, and the thin metal strip 9 would now act as a flat spiral, torsion spring (aka. hairspring) and would wind the cord/string 6 around the spring assembly 3 when the coil is allowed to relax and impart a driving force to the device.

Figure 3:
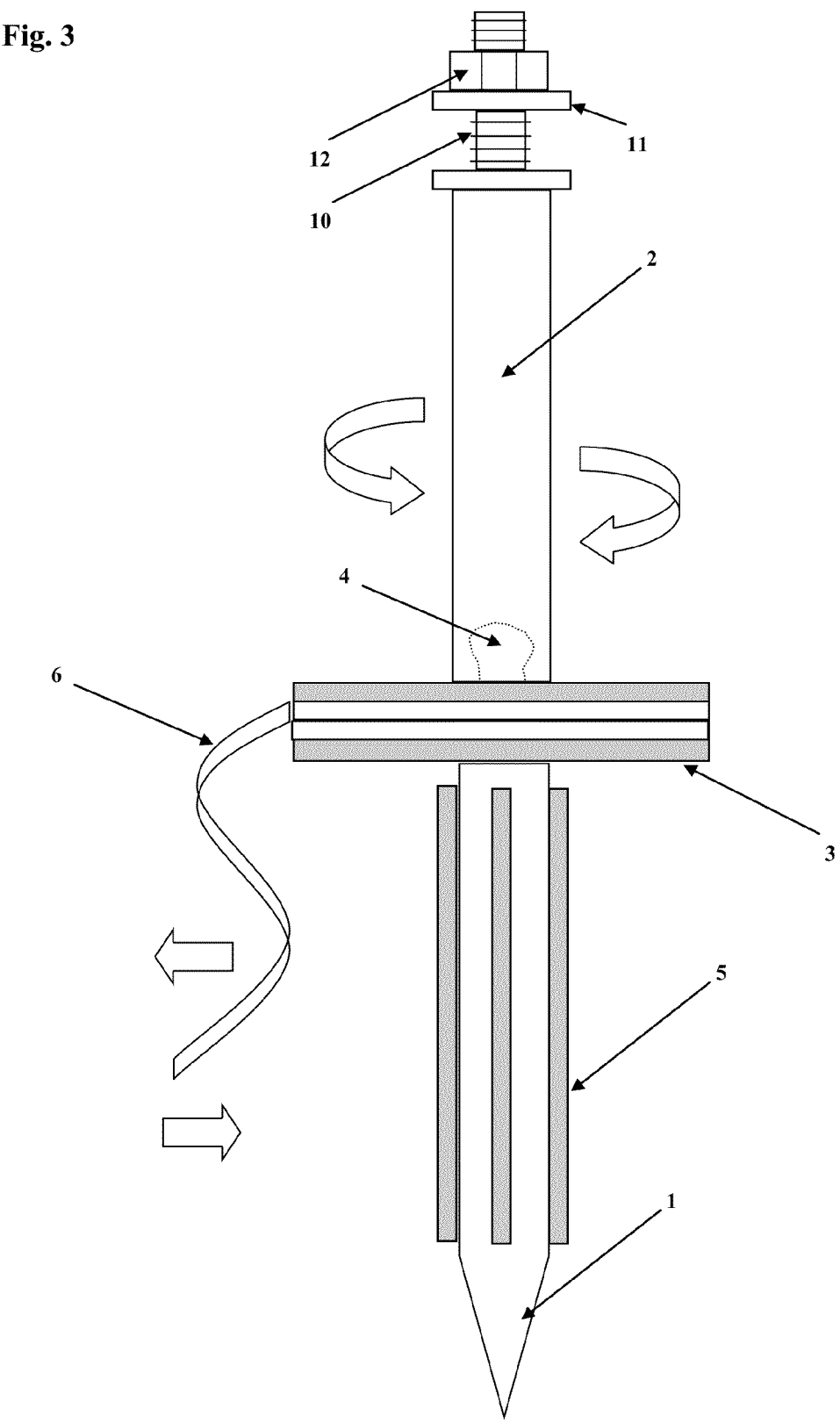
FIG. 3 is a front view of another embodiment of a tension/compression decoy motion device of the present invention.

In one embodiment of the present invention, as set forth in FIG. 1, the upper stake 2 is shown to have the same pointed end as the lower stake 1. In another embodiment, and as depicted in FIG. 3, the upper stake 2 is shown to have a threaded top 10 on which a washer 11 and nut 12 assembly would act as an anchoring point for the decoy (not shown). This anchoring point would be more secure and stable than the simple resting mount present on the upper stake 2 in FIG. 1. This entire invention in any of the embodiments presented may be made of virtually any material (fiberglass, metal, plastic, foam, glass or wood) and be of the dimensions sufficient to efficiently contain all the components of the present invention without limitation.

Figure 4:
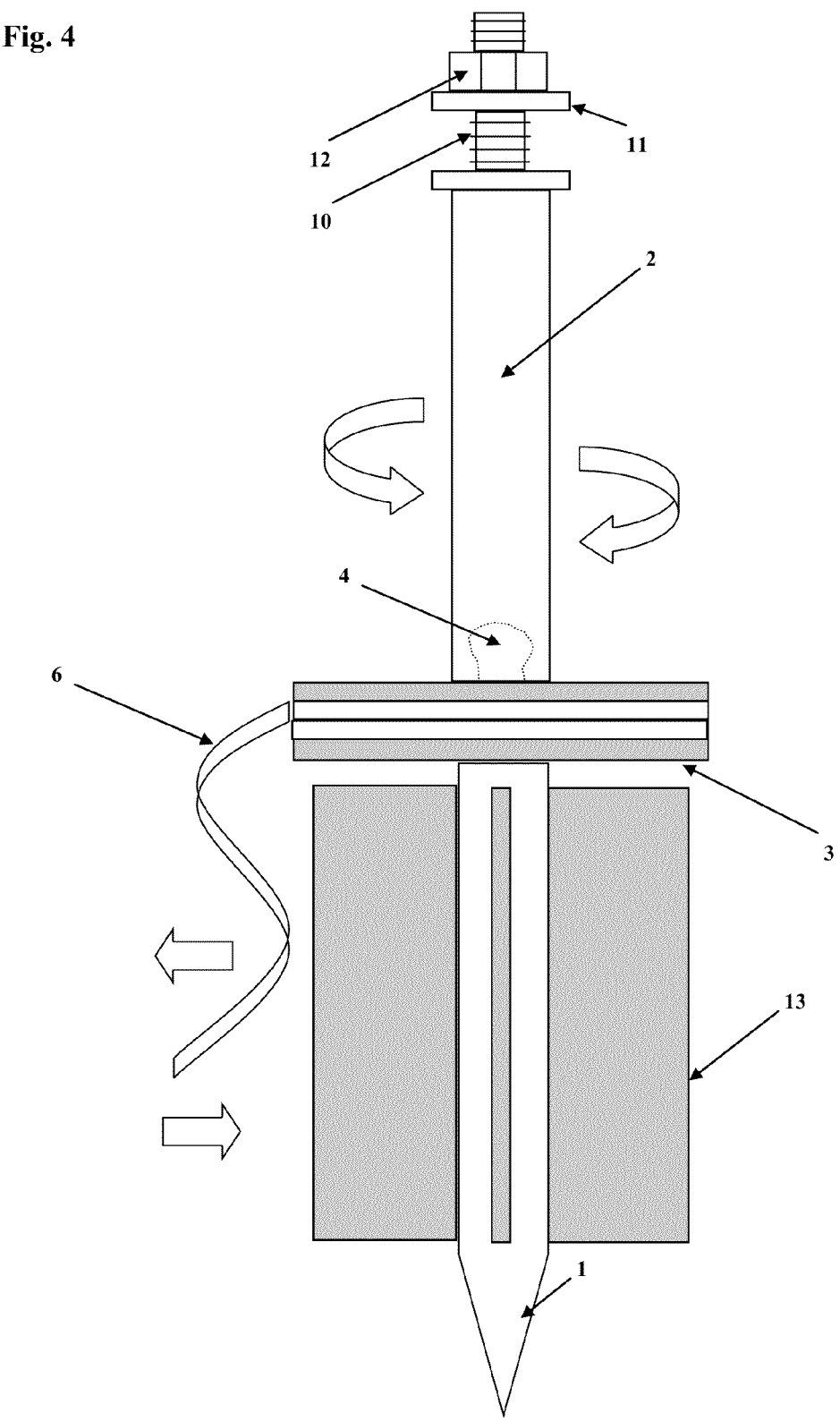
FIG. 4 is a front view of another embodiment of a tension/compression decoy motion device of the present invention.

Referring now to the invention shown in FIG. 4 there is shown yet another side view of another embodiment of the present invention. In this embodiment the lower stake 1 is shown to contain enlarged fins 13. These larger fins 13 would be useful if the current device was to be used in a water environment by acting somewhat as a water anchoring point where the typical anchoring point (the ground) is not reachable. The intended use for this embodiment would be to mount the upper stake 2 to a waterfowl decoy that is already rigged in the traditional means with an anchor and line. The enlarged fins 13 would have sufficient drag in water as to allow the circular motion to be imparted to the decoy mounted to the upper stake 2. Although this embodiment shows the threaded top 10, washer 11 and nut assembly also shown in FIG. 3 it shall not be limited to such means of mounting. Other forms of attachment of the decoy to the device shall include but not be limited to various forms of clips and hooks. Also, this embodiment of the current invention mentions that the circular motion is imparted to the decoy itself, however the device with the enlarged fins 13 could be designed so that the fins themselves would do the 'spinning' and help to create a surface motion. These enlarged fins 13 could be manufactured in all shapes, sizes, materials and angles in order to achieve the desired effect. It should be understood that other embodiments of the present invention could use a different combination of these components than those mentioned. It should also be noted that the device could be tied into a plurality of decoy devices so that it could impart motion to multiple decoys. This could be accomplished in a multitude of ways, but one such way would be to put the current invention at the far end of a line with a plurality of decoys in between the line to the sportsman. When the sportsman pulls and releases the cord/string 6 the decoys would move back and forth as the thin metal strip 9 acting as a torsion spring both expands and contracts.

Figure 5:
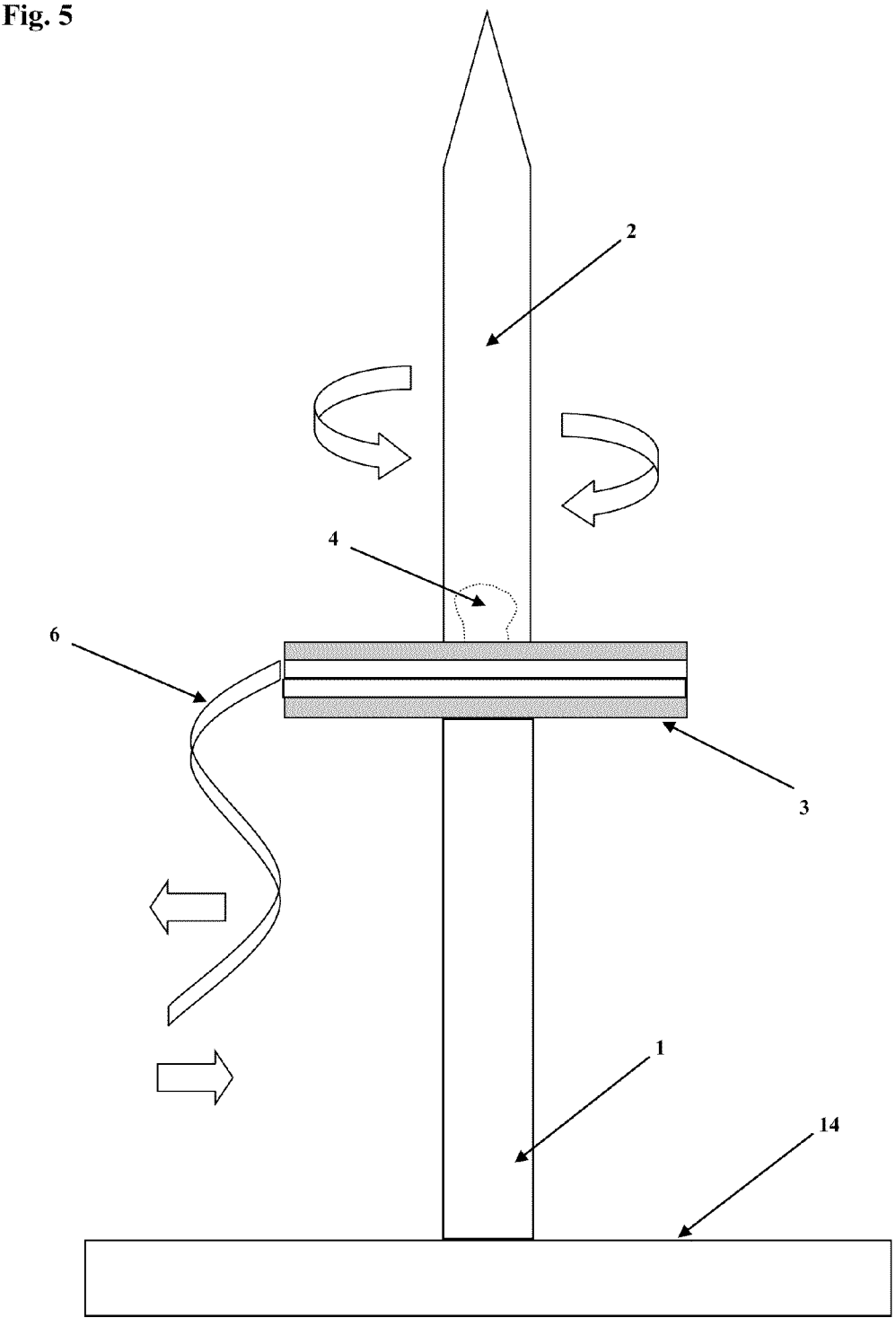
FIG. 5 is a front view of another embodiment of a tension/compression decoy motion device of the present invention.

In FIG. 5 the current invention is shown that it may be further equipped with another version of an anchoring point for the lower stake 1 in the form of a base plate 14. The base plate 14 will simplify the proper installation of the device in terrain where the lower stake 1 with the somewhat pointed end is not feasible. Rocky, icy and muddy terrain are a few examples of terrain where the base plate 14 could be utilized.

The advantages of the present invention include, without limitation, is that it provides the individual and/or sportsman another means of coaxing a game animal into effective range. The device will help to eliminate wary and spooked game due to motionless decoys. The movement that is required to impart motion to the decoy can be kept at a minimum. The present invention will allow for the full decoy to be rotated. The device will allow full 360 degree rotation, with further rotation and counter-rotation also possible. Further, the device will not require any electronic means of operation and would therefore be light, easy to pack and require little maintenance. The lack of electronic parts should allow for the use of the product even in those areas that have banned the use of electronic calls and decoy devices. Further still, the device will be universal and designed to fit a wide variety of the currently known decoys so the additional cost of adding motion to one's decoys will be minimized.

In broad embodiment, the present invention is a motion imparting decoy device. This device will allow the typical sportsman to have a greater rate of success when pursuing game animals, but may also be used in numerable other situations where it is desired to give motion to a static object.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods within the scope and spirit of the invention.

The invention claimed is:

1. A tension/compression decoy motion device comprising:
  a. a lower member comprising:
    i. a longitudinal axis parallel to the longitudinal axis of an upper member;
    ii. two ends wherein the first end is connected to a center member, and the second end is made for either insertion into the ground, into a platform, or left unattached;
  b. the upper member comprising:
    i. a longitudinal axis parallel to the longitudinal axis of the lower member;
    ii. two ends wherein the first end is connected to the center member, and the second end is fashioned in a way that allows for attachment to various decoys;
  c. the center member comprising:
    i. of two halves that are at an axis perpendicular to the axis of the upper and lower member;
    ii. one of the two halves having a slightly smaller diameter as the other half, and the smaller half able to slide into the larger half;

iii. the smaller half having a recessed groove to allow for the attachment of the filament, this filament being covered by the larger half;
iv. the larger half having a slot to allow the passage of the filament to the outside of the center member;
v. one of the two halves having a center pole that has a longitudinal axis that is parallel to longitudinal axis of the upper and lower members with the other half of the center member having a slot for insertion of the opposing center pole that allows the two halves to be joined but still be able to rotate independently of the other half;
vi. the upper half of the center member being attached to the upper member, and the lower half of the center member being attached to the lower member;

d. a tension /compression connector comprising:
i. a tension /compression element having one end fixed to the side of one half of the center member and the other end fixed to the center pole of the other half of the center member;

e. the filament coupled to the smaller diameter half of the center member and extending through the slot in the larger diameter half of the center member and extended to the user,
wherein the tension/compression element contained within the two halves causes two halves and therefore the upper and lower member to have a set position relative to one another while at rest;
wherein a force applied to the tension/compression element by the filament causes one half of the center member and therefore the upper and lower members to rotate away from the set resting position relative to one another;
wherein when this force that has been applied to filament and in turn the tension/compression element is lessoned it causes one half of the center member and therefore the upper and lower members to move back toward the set resting position relative to one another.

2. The tension/compression decoy motion device of claim 1, wherein the tension/compression connector is selected from the materials consisting of:
a. a torsion spring
b. a flat spring
c. a coil spring
d. a spiral spring
e. an elastic band, and
f. a combination of two or more of a) through e).

3. The tension/compression decoy motion device of claim 1, wherein:
a. the filament is selected from a string, wire, monofilament, cable or thread
b. the filament has an external section and an internal section contained within the walls of the larger diameter center member half, wherein;
i. the external section of the filament has a stop placed at the point along the filament that would correlate with the desired position of rest for the upper and lower members;
c. the external section of the filament is not allowed passage into the internal section of the center member via the slot on the center member being produced to a size that is large enough for the passage of the filament, but small enough to prevent passage of the entirety of the external section of the filament into the internal section of the center member.

4. The tension/compression decoy motion device of claim 1, wherein the external section of the filament is irremovably coupled to the internal section of filament.

5. The tension/compression decoy motion device of claim 1, wherein the external section of the filament is removably coupled to the internal section of filament.

6. The tension/compression decoy motion device of claim 1, wherein the upper and/or lower member can be reduced or added to adjust the total length of the members.

7. The tension/compression decoy motion device of claim 1, wherein the lower member can be made in a way to warrant different situations such as;
a. placement in the ground;
b. placement in a platform;
c. placement in a free motion environment such as water.

8. The tension/compression decoy motion device of claim 1, wherein the lower member is removable attached to the tension/compression decoy motion device, and is interchangeable depending on the situation.

9. The tension/compression decoy device of claim 1, having a lower member with enlarged fins wherein;
a. the fins could be either parallel to the axis of the lower member or at various angles to the axis of the lower member;
b. the fins could be of varying sizes and shapes;
c. the fins could be made of varying materials consisting of,
i. wood, plastic or metal.

10. The tension/compression decoy device of claim 1, wherein the manual rotation of device can be tied into a plurality of decoy devices so that it could impart motion to multiple decoys by;
a. placing the device at the far end of a line and anchored, with a plurality of decoys in between the device and the user;
b. placing the device between several decoys inline with the user.

11. The tension/compression decoy device of claim 1, wherein the device is used as a whole with the upper, lower and center members or in part with the user choosing to just use the center member to impart motion wherein the upper and lower members are not attached to the center member.

12. The tension/compression decoy motion device of claim 1, wherein the rotation away from the resting position can extend beyond 360 degrees.

13. The tension/compression decoy motion device of claim 1, wherein the upper, lower and center members are irremovably attached to each other.

14. The tension/compression decoy motion device of claim 1, wherein the upper, lower and center members are removably attached to each other and can be broken down for transport and placed back together for use.

* * * * *